Oct. 28, 1924.
S. A. HEATER
DIRIGIBLE HEADLAMP
Filed Sept. 1, 1923
1,513,502
2 Sheets-Sheet 2
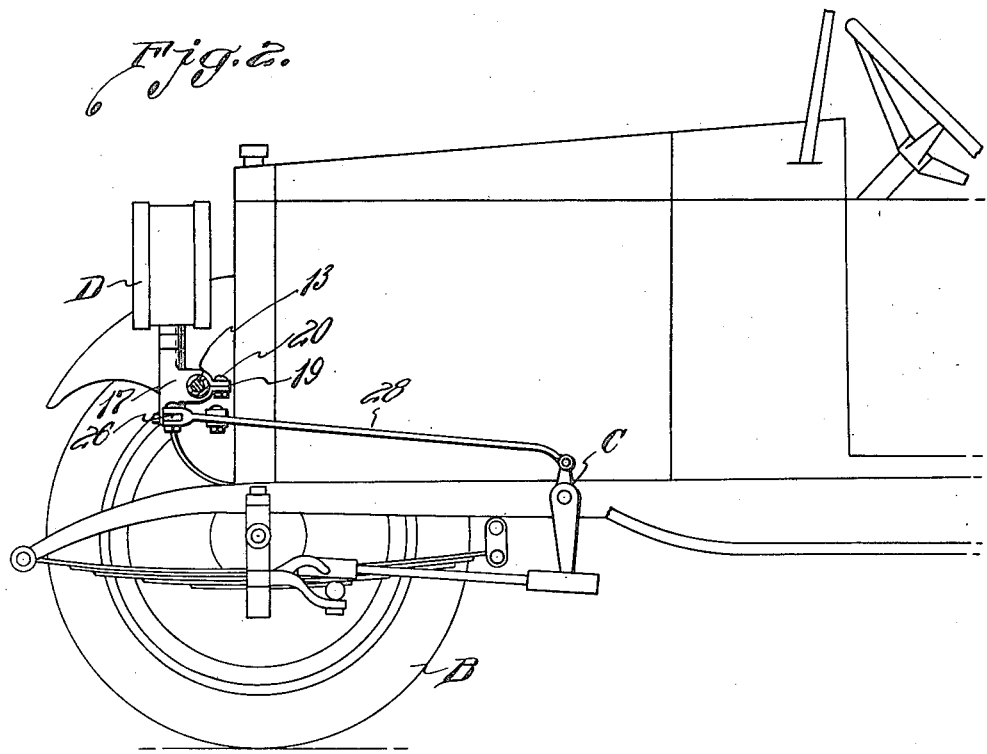
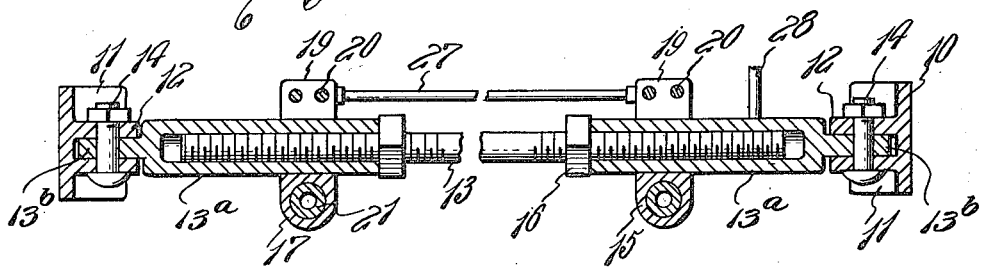

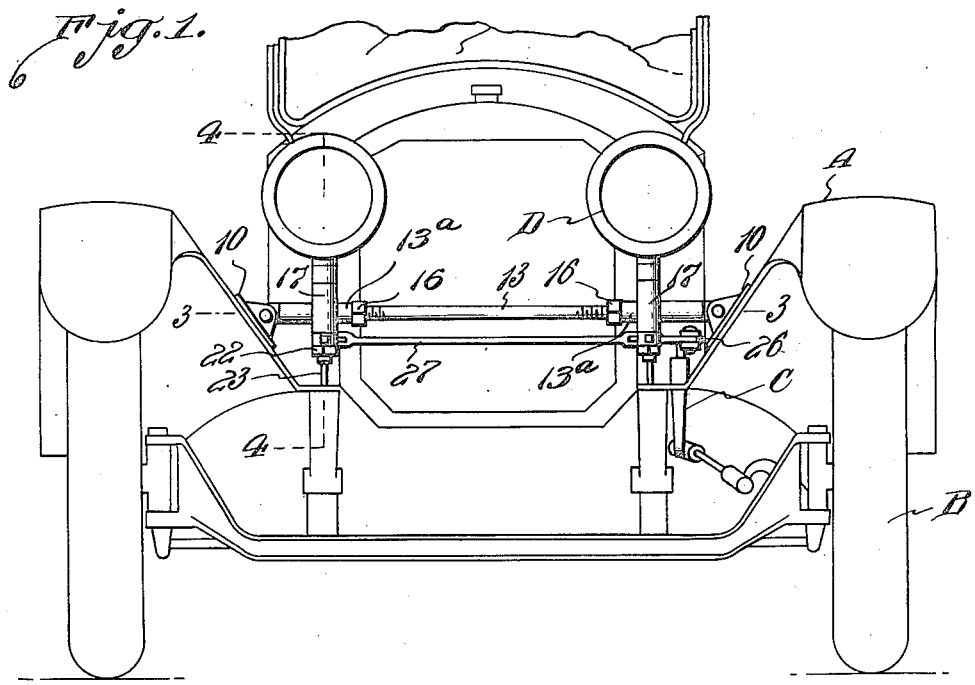

Patented Oct. 28, 1924.

1,513,502

UNITED STATES PATENT OFFICE.

SINNAIR A. HEATER, OF WASHOUGAL, WASHINGTON.

DIRIGIBLE HEADLAMP.

Application filed September 1, 1923. Serial No. 660,576.

*To all whom it may concern:*

Be it known that I, SINNAIR A. HEATER, a citizen of the United States, residing at Washougal, in the county of Clarke and State of Washington, have invented new and useful Improvements in Dirigible Headlamps, of which the following is a specification.

This invention relates to headlamps for motor vehicles and has for its object the provision of a novel mounting and operating means for the lamps whereby they will be caused to turn in accordance with the movement of the front wheels during steering so as to throw light upon curves as well as upon straight roads, the device having the great advantage of making night driving far safer and easier than is possible with use of the ordinary rigid lamps.

An important object is the provision of a mounting so constructed that the lamps may be individually adjusted so that they may be caused to throw their light straight ahead or in a slight downward direction as may be preferred to secure the desired illumination.

Another object is the provision of a mounting of this character in which relative movement of certain of the parts is permitted so that the racking of the fenders and body when passing over rough roads will not in any way interfere with or derange the lamp operating mechanism.

An additional object is the provision of a device of this character which will be simple and inexpensive to manufacture, easy to install, efficient and positive in action, durable in service and a general improvement in the art.

With the above and other objects and advantages in view the invention consists in the details of construction to be hereinafter more fully described and claimed and illustrated in the accompanying drawings, in which:

Figure 1 is a front elevation of my complete mechanism,

Figure 2 is a side elevation, the forward wheel being omitted,

Figure 3 is a horizontal section on the line 3—3 of Figure 1,

Figure 4 is a vertical section on the line 4—4 of Figure 1,

Figure 5 is a detail perspective view of one operating arm.

Referring more particularly to the drawings the letter A designates the front fenders of an automobile, B designates the front wheels, and C the steering arm which is operated by the usual steering wheel for turning the wheels. In carrying out my invention I provide supporting brackets 10 which are mounted upon the inclined inner portions of the front fenders, and each of these brackets is formed as an elongated plate 11 of any desired size and shape provided with spaced ears 12. Extending across the front of the machine in advance of the radiator is a rod or pipe 13 which has its ends screwed into sockets 13$^a$ terminating in lugs 13$^b$ received between the pairs of ears 12 and pivoted thereto by bolts 14, or rivets if preferred. Lock nuts 16 are provided on the rod 13 for preventing unscrewing. The lamp mountings are carried on the socket members 13$^a$ and each lamp mounting includes a sleeve 15 rotatably adjustable by means to be described and carries upward and downward tubular extensions 17. Each sleeve is split or formed in two sections as shown and the edges of the sections are formed with flanges 19 held together by suitable bolts 20. By loosening these bolts, the members may be rotatably adjusted on the rod or shaft 13 whereupon the adjustment will be maintained when the bolts are subsequently retightened.

The lamps D are mounted upon stems 21 which are rotatably mounted through the tubular extensions 17. These stems are prevented from withdrawal from their bearings by means of suitable nuts 22. The current carrying wires 23 for the bulbs within the lamps are led through these stems which are necessarily hollow for this purpose.

Mounted on the lower end of one stem is a single arm 24 while mounted on the lower end of the other is a member including two arms 25 and 26. The arms 24 and 25 are connected by a rod 27 while the arm 26 is connected to the steering arm C of the vehicle by a rod 28.

In the operation it will be seen that when the device is constructed and installed as above described, whenever the steering mechanism is operated to turn the vehicle, the lamps will be correspondingly swung so as to throw their light upon the road way at all times just as well along curves as on straight roads, the action being absolutely automatic and positive. Adjustment of the lamps to throw their light properly upon the road way when in normal position is effected by rotating them upon the supporting rod or pipe 13 and then clamping them in the adjusted position. Owing to the fact that the ends of the rod or pipe 13 are pivotally connected with the brackets 10 it is obvious that the machine may rack, as for instance when passing over rough roads, without causing any strain upon or derangement of the mechanism.

Having thus described my invention I claim:

1. In a dirigible headlamp mounting for motor vehicles, brackets secured upon the front fenders, a horizontal support having its ends pivotally connected with said brackets, standards rotatably adjustably mounted upon the end portions of said support, and stems carrying the headlamps and journaled through said standards and means connecting the stems and connected with the steering mechanism of the vehicle whereby to swing the lamps simultaneously in accordance with movement of the front wheels.

2. In a headlamp mounting of the character described, brackets secured upon the front fenders, a horizontal support located in advance of the radiator and having its ends pivoted upon said brackets, standards mounted upon the end portions of said support and each including upper and lower tubular extensions and a sectional sleeve equipped with clamping bolts, stems carrying the lamps and rotatably mounted through said tubular extensions, and means connected with the stems and with the steering mechanism of the vehicle for effecting simultaneous turning of the lamps.

3. In a headlamp mounting of the character described, brackets secured upon the front fenders, a horizontal support located in advance of the radiator and having its ends pivoted upon said brackets, standards mounted upon the end portions of said support and each including upper and lower tubular extensions and a sectional sleeve equipped with clamping bolts, stems carrying the lamps and rotatably mounted through said tubular extensions, and means connected with the stems and with the steering mechanism of the vehicle for effecting simultaneous turning of the lamps, the operating means including a single arm secured to the lower end of one stem, a double arm member secured to the lower end of the other stem and having one arm thereof connected with said first named arm, and a rod connected with the remaining one of the double arm member and connected with the steering arm of the vehicle.

4. In a headlamp mounting, brackets secured upon the front fenders of a vehicle, a horizontal support located in advance of the radiator, sockets screwed on the ends of said support and pivotally connected with said brackets, standards rotatably adjustably mounted upon said sockets and equipped with clamping means, said standards having tubular portions, lamp carrying stems rotatably mounted through said tubular portions, and means connected with the stems and with the steering mechanism of the vehicle for effecting simultaneous turning of the lamps.

In testimony whereof I affix my signature.

SINNAIR A. HEATER.